United States Patent

Meyfarth

[15] 3,651,692
[45] Mar. 28, 1972

[54] LINEAR FLUID FLOW RESISTANCE ELEMENT

[72] Inventor: Philip F. Meyfarth, c/o Alar Products, Inc. 7016 Euclid Avenue, Arlington, Mass. 44103

[22] Filed: Jan. 12, 1970

[21] Appl. No.: 2,320

[52] U.S. Cl............................................73/205 L, 251/208
[51] Int. Cl. ..............................................G01f 1/00
[58] Field of Search ....................73/205; 251/210, 211, 180, 251/208; 137/625.21

[56] References Cited

UNITED STATES PATENTS

| | | |
|---|---|---|
| 3,253,616 | 5/1966 | McCorkle et al. ................251/208 X |
| 3,446,423 | 5/1969 | Carroll..............................137/625.21 |
| 2,911,008 | 11/1959 | Du Bois ..............................251/208 X |

Primary Examiner—Jerry W. Myracle
Attorney—Kenway, Jenney & Hildreth

[57] ABSTRACT

In the apparatus disclosed herein, a plurality of fluid flow channels are sequentially blocked and opened so that the fluid flowing through each channel is alternately accelerated and decelerated. As the acceleration is determined substantially by the pressure across each channel and the mass of the fluid within the respective channel, the mass flow rate and the pressure drop across the apparatus are substantially linearly related and are substantially independent of the density of the fluid.

9 Claims, 5 Drawing Figures

PATENTED MAR 28 1972  3,651,692

INVENTOR
PHILIP F. MEYFARTH
BY
Kenway, Jenney & Hildreth
ATTORNEYS

3,651,692

LINEAR FLUID FLOW RESISTANCE ELEMENT

BACKGROUND OF THE INVENTION

Typical prior art fluid flow resistance elements, e.g., orifice plates, capillary tubes and the like, present various problems in operation. For example, orifice plates are nonlinear in operation while capillary tubes are highly sensitive to viscosity and density. Thus, although such prior art elements have often been used in flow meters, the measurement obtained is typically not directly related to mass flow but rather is a measurement which must be corrected to a significant extent depending upon the range of fluid velocities under consideration or the density of the fluid medium.

In the practice of the present invention, a substantially linear fluid flow resistance characteristic is obtained by utilizing a type of intermittent flow control which minimizes the non-linearities usually present when dealing with a moving fluid. In particular, the present invention operates by periodically stopping the flow in each of a plurality of channels and then allowing the fluid to be accelerated, substantially freely, by the pressure differential across the channel. Ideally, the fluid is thus either stopped or accelerating at a predeterminable rate so that the fluid never gives up energy through the eddying or viscous mechanisms associated with a normal orifice type resistance element. Accordingly, a substantially linear relationship between mass flow and pressure drop is preserved, assuming that the gating or valving rate is constant. A more complete mathematical explanation of this mode of operation is given in my thesis for the Ph. D. degree at the Massachusetts Institute of Technology, Cambridge, Massachusetts, submitted on Jan. 13, 1969.

Among the several objects of the present invention may be noted the provision of a flow resistance element in which mass flow rate and pressure drop across the element are substantially linearly related; the provision of a flow meter providing a substantially true mass flow rate measurement; the provision of such apparatus which is highly reliable and accurate in operation; the provision of a chopping type flow meter in which the pressure drop across the flow meter is substantially proportional to chopping rate; and the provision of such apparatus which is relatively simple and inexpensive. Other objects and features will be in part apparent and in part pointed out hereinafter.

SUMMARY OF THE INVENTION

Briefly, the flow resistance element of the present invention is adapted for use in a fluid flow conduit having an upstream portion and a downstream portion. The element includes means defining a plurality of fluid flow channels, each of which has one end in communication with the upstream portion and includes also valving means for alternately blocking and opening to the downstream conduit portion the other end of each of the channels. Thus, the fluid flowing through each channel is alternately accelerated and decelerated. The valving means operate to open the different channels sequentially thereby substantially interlacing the pulsating flow components from the different channels. Accordingly, the mass flow rate and the pressure drop across the resistance element by the alternate acceleration and deceleration are substantially linearly related.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
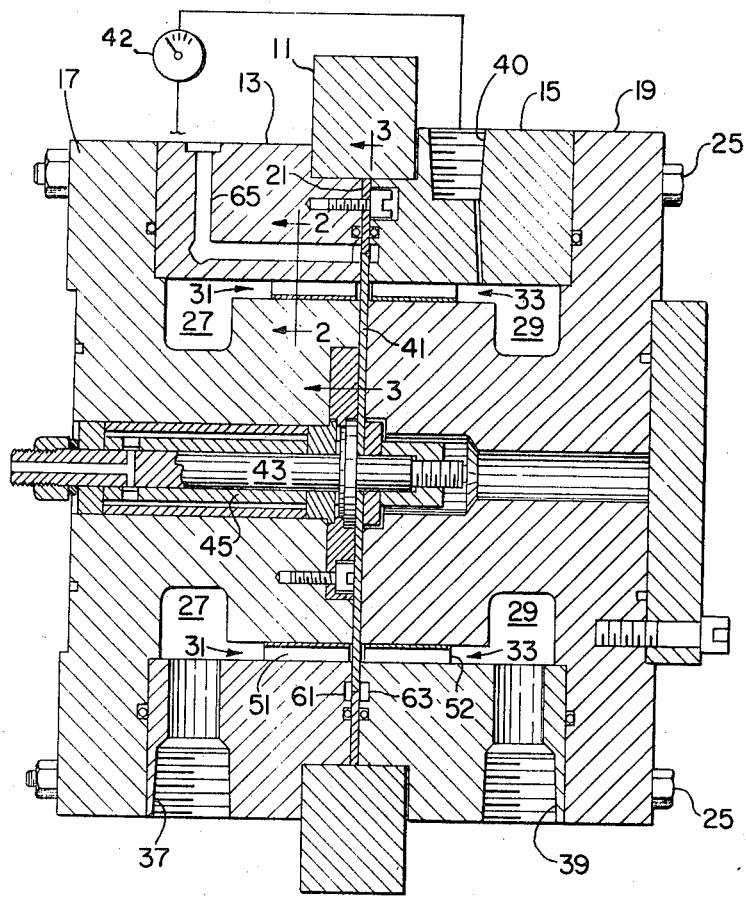
FIG. 1 is a top view in section of a rotary flow resistance element constructed in accordance with the present invention.

Referring now to FIG. 1, the housing of the apparatus illustrated there is made up of five main parts: a support ring 11; left and right housing rings, 13 and 15 respectively; and left and right end caps, 17 and 19 respectively. For reasons which will be apparent hereinafter, these five elements are assembled with a thin spacer ring 21 between the two housing rings 13 and 15, the entire assembly being then clamped through bolts 25. O-ring seals are provided at appropriate points as indicated in the drawings.

The end caps 17 and 19 include portions which fit within the respective housing rings 13 and 15 and which are shaped to provide an annular inlet manifold 27, an annular outlet manifold 29 and facing annular passageways 31 and 33 respectively. An inlet port 37 is provided in communication with the inlet manifold 27 and likewise an outlet port 39 is provided in communication with the manifold 29.

A chopping or valving disc 41 is mounted on an axle 43 for rotation between the left and right end caps 17 and 19 in the space provided by the spacer 21. Shaft 43 is journaled in the left end cap 17 in a suitable bearing structure as indicated at 45. The left hand end of shaft 43 projects beyond the end cap 17 so that the disc 41 may be driven in rotation through the shaft, e.g., from a variable speed motor through a suitable universal or flexible coupling (not shown).

Figure 2:
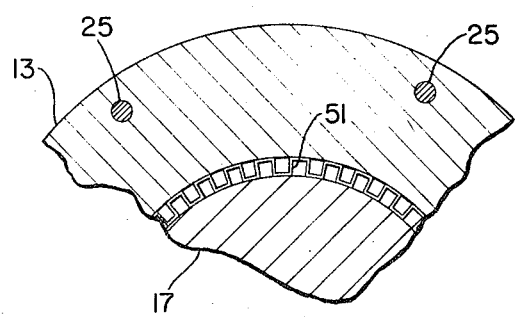
FIG. 2 is a partial sectional view taken substantially on the line 2—2 of FIG. 1.
Figure 3:
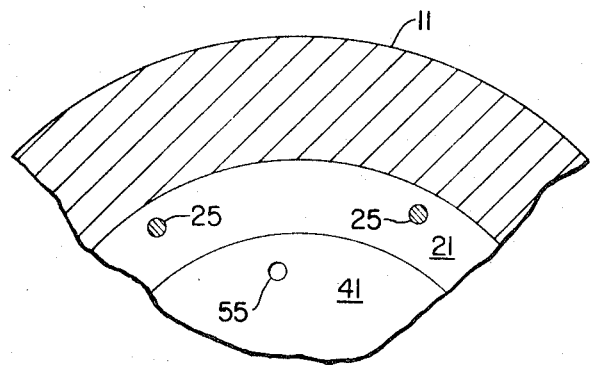
FIG. 3 is a partial sectional view taken substantially on the line 3—3 of FIG. 1.

The annular channels 31 and 33 are divided into a plurality of parallel channels of substantially uniform cross-sectional area by means of separator or wall elements 51 and 52 which, as may be best seen in FIG. 2, have convoluted or corrugated configurations. Such a separator may be conveniently formed by bending thin metal sheet stock. The individual channels formed by members 51 and 52 are blocked a majority of the time by disc 41. However, as may be seen in FIG. 3, disc 41 includes at least one aperture 55 extending through the disc from face to face at a radial position which aligns with the facing annular channels 31 and 33. Thus, as the disc 41 rotates, the individual channels formed by the separator members 51 and 52 are sequentially opened to the outlet manifold 29. While members 51 and 52 provide relatively thin dividing walls between the parallel channels, thicker dividing wall members, e.g., having a thickness in the order of the channel width, may also be used. Such thicker wall members have the advantage of reducing leakage between adjacent channels.

The apparatus illustrated in FIG. 1 is particularly arranged for use with a gaseous fluid medium, e.g., air. For this use, a centrifugal liquid seal is employed for preventing the escape of gas around the periphery of the chopping disc 41. To provide this seal, the opposed faces of the housing rings 13 and 15 are provided with annular grooves 61 and 63 which face each other substantially at the interface between the chopping disc 41 and the spacer ring 21. A suitable sealing liquid, e.g., water, can be introduced to this juncture through a passageway 65 in housing ring 13. When the disc 41 is rotating at operational speed, contact between the water and the disc 41 is limited to the periphery of the disc 41 due to the action of centrifugal force. The pressure of this water at the periphery, however, provides an effective seal preventing the escape of air from the inlet manifold 27 to the outlet manifold 29 except through the apertures 55 in the chopping disc 41.

In operation, gas is admitted to the inlet manifold 27 through the port 37 and is withdrawn through the outlet manifold 29 and port 39. The pressures at the inlet and channels are monitored, e.g., by means of suitable pressure taps such as indicated at 40 on the outlet side. Though not shown, a similar tap is preferably also employed on the inlet side, e.g., at a different angular orientation relative to the disc axis. A gauge for indicating the pressure differential between the inlet and outlet taps is indicated at 42. The chopping disc 41 is then rotated, at a speed such that the gas flow through each of the plurality of individual parallel channels is limited, substantially completely, by the inertial effect described previously. In other words, the individual flow components do not act in the nonlinear fashion normally associated with orifice plates and other such resistance devices. Rather, the mass of fluid in each channel is alternately accelerated and stopped. The inlet and outlet manifolds, being of substantially larger area than the individual channels, provide a high capacity source and sink to the flow components passing through the individual channels. When operated as described, apparatus such as that illustrated has been found to exhibit a substantially linear resistance over a considerable range of pressure differentials. In addition, the measurement obtained is essentially a true mass flow measurement rather than a measurement which must be substantially modified or corrected to obtain mass flow. Stated in another way, the mass flow rate is substantially linearly related to the pressure drop across the device and is substantially independent of fluid density.

A further advantage of the apparatus illustrated is that it is substantially symmetrical and can be operated with fluid flowing in either direction. Thus, although various channels and ports have been described as being inlet or outlet, it should be understood that such roles are reversible. As will be apparent to those skilled in the art, a flow meter which can be used in conduits subject to reversible flow is highly desirable.

Figure 4:
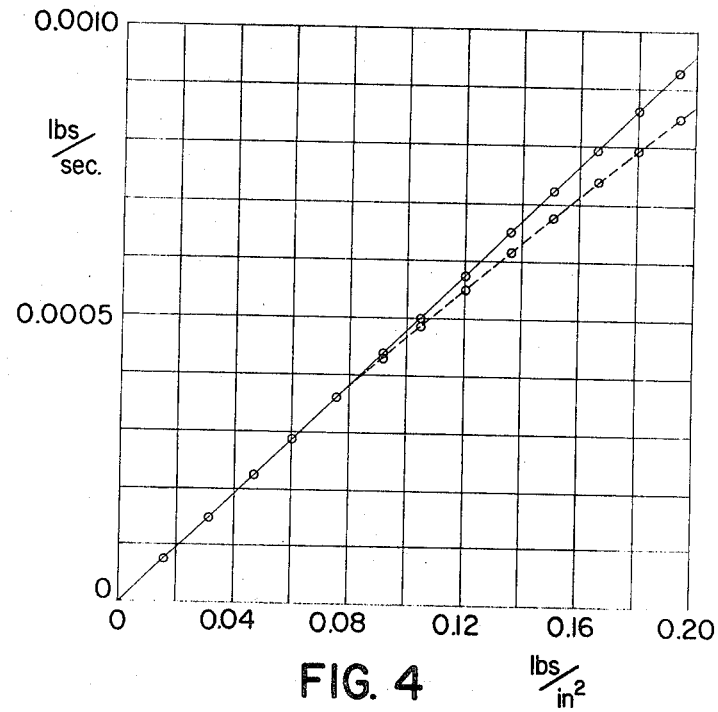
FIG. 4 is a graph representing the substantially linear behavior of apparatus according to this invention.

FIG. 4 represents the behavior of apparatus substantially identical to that shown in FIG. 1 operating on air flows at two different densities, i.e., at different nominal pressures. The solid line plot is for air at 60 pounds per square inch and the broken line plot is for air at 15 pounds per square inch. In this graph, the ordinate represents mass flow while the abscissa represents pressure differential. In the apparatus used in conducting the tests which provided the data for FIG. 4, the chopping disc was provided with two valving apertures, i.e., the apertures 55 in FIG. 3, each of which had an area of 0.0122 square inches. The nominal radius of these apertures and of the multiple parallel channels was 1.250 inches. The disc was rotated at a speed of 8,000 r.p.m. The mean width of each of the individual parallel channels was about one-tenth inch and length (on both sides of disc 41) was about 1.6 inch so that the ratio of length to mean width was about 16. Similarly, the ratio of the mean width of each channel to the sum of the mean widths of the channel plus the chopping aperture 55 was about 0.870.

From the graph of FIG. 4 it can be seen that, at both densities, the mass flow rate behaves as a substantially linear function of pressure differential, although at the higher pressure differentials some non-linearity is perceptible in the less dense medium. Further, the two curves are substantially coincident over a considerable range thus indicating that the measurement obtained is truly representative of mass flow rate rather than being a more complicated function of density and pressure differential.

The slight non-linearity observable at high flow rates at low density is consistent with present understanding or theory applicable to this apparatus as described in the Ph. D. thesis mentioned previously. Briefly, it may be noted that the idealized linear behavior is predicated upon there being substantially no change of density within the apparatus. As will be apparent to those skilled in the art, the use of a substantial pressure differential with a gas flow at a relatively low absolute pressure is inconsistent with maintaining uniform density.

It has also been found that the pressure drop varies as a substantially linear function of the valving or gating rate, assuming a constant mass flow. Accordingly, apparatus according to the present invention may also find use in tachometer applications where it may be desired to find the gating rate or speed of rotation of disc 41.

Figure 5:
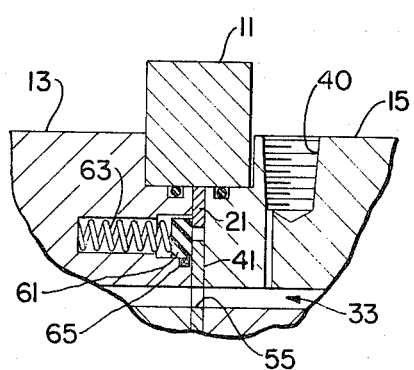
FIG. 5 is a partial sectional view, similar to FIG. 1, of another embodiment.

The embodiment illustrated in FIG. 5 is adapted for use with a liquid flow medium rather than the gaseous flow medium of FIG. 1. The apparatus is essentially similar to that illustrated in FIG. 1 except that the centrifugally maintained liquid seal has been eliminated and in its place an annular carbon ring 61 is pressed against the peripheral portion of the left hand face of the rotating disc 41 by a plurality of springs 63 spaced around member 17. The carbon seal itself is sealed to the housing ring member 13 by O-rings 65 as indicated.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. In a fluid flow conduit having an upstream portion and a downstream portion and adapted to pass a fluid stream, a substantially linear flow resistance element comprising:

means defining a plurality of fluid flow channels each of which has one end in communication with said upstream portion;

valving means for alternately blocking and opening to said downstream conduit portion the other end of each of said channels thereby to cause the portion of said stream flowing through that channel to be alternately accelerated and decelerated in response to a pressure drop developed across said element by said fluid stream, said valving means being operative to open the different channels sequentially thereby to substantially interlace pulsating flow components from the different channels, and means for measuring the pressure drop across said element, whereby the mass flow rate through said element and the pressure drop developed across said resistance element by the alternate acceleration and deceleration are substantially linearly related.

2. In a fluid flow conduit adapted to pass a fluid stream, a substantially linear flow resistance element comprising:

means defining a fluid flow channel of substantially uniform cross-sectional area;

an inlet manifold in communication with one end of said channel, the cross-sectional area of said inlet manifold being substantially larger than that of said channel;

an outlet manifold, the cross-sectional area of said outlet manifold being substantially larger than that of said channel;

valving means for alternately blocking and opening to said outlet manifold the end of each of said channel opposite said inlet manifold thereby to cause fluid flowing through said channel to be alternately accelerated and decelerated in response to a pressure drop developed across said element by said stream; and means for measuring the pressure drop across said element, whereby the mass flow rate and the pressure drop developed across said resistance element by the alternate acceleration and deceleration are substantially linearly related.

3. In a fluid flow conduit having an upstream portion and a downstream portion and adapted to pass a fluid stream, a substantially linear flow resistance element comprising:

a disclike valving member journaled for rotation around the axis of the disc, said valving member having at least one gating aperture spaced radially a predetermined distance from the axis of the disc;

means defining a plurality of parallel fluid flow channels each of which has one end in communication with said upstream portion, said channels being disposed annularly around said axis on one side of said disc at said predetermined radial distance so that each channel is blocked by said disc except when said aperture is in alignment with that channel, the other side of said disc being in communication with said downstream portion whereby the portion of said fluid stream flowing through each channel is alternately accelerated and decelerated as said disc is rotated in response to a pressure drop developed across said element by said stream; and means for measuring the pressure drop across said element, whereby the mass flow rate and the pressure drop developed across said resistance element by the alternate acceleration and deceleration are substantially linearly related.

4. A fluid flow resistance element as set forth in claim 3 wherein said disclike valving member blocks said channels substantially at their midpoints, whereby said element can be operated with fluid flow in either direction.

5. A linear flow resistance element comprising:
a disclike valving member journaled for rotation around the axis of the disc, said valving member having at least one gating aperture spaced a predetermined distance radially from the axis of the disc;
means defining an annular inlet manifold and an annular inlet passage concentric with said axis, said inlet passage being located radially in alignment with the path of said gating aperture on one side of said disclike member;
means defining an annular outlet manifold and annular outlet passage concentric with said axis, said outlet passage being located radially in alignment with the path of said gating aperture on the other side of said disclike member;
means for measuring the pressure drop produced across said element by a fluid stream passing through said element; and
means for dividing said annular inlet channel into a plurality of channels extending parallel to said axis, whereby, as said disclike member rotates, the portion of said fluid stream flowing through each of said parallel channels will be alternately accelerated and stopped by the pressure drop developed across said element by said stream and the mass flow rate will vary as a substantially linear function of pressure differential.

6. A fluid flow resistance element as set forth in claim 5 including means for introducing liquid around the periphery of said disc thereby to provide a seal for preventing the leakage of gas past said disc when gas is the fluid flowing between said inlet manifold and said outlet manifold.

7. A fluid flow resistance element as set forth in claim 5 including a carbon ring seal and spring means for biasing said ring seal against said disclike member adjacent its periphery.

8. A fluid flow resistance element as set forth in claim 5 wherein said means for dividing said inlet channel comprises a convoluted strip of thin sheet material.

9. A fluid flow resistance element as set forth in claim 5 further comprising means for dividing said outlet channel into a plurality of channels extending parallel to said axis whereby said resistance element can be operated with fluid flow in either direction.

* * * * *

UNITED STATES PATENT OFFICE
CERTIFICATE OF CORRECTION

Patent No. 3,651,692        Dated March 28, 1972

Inventor(s) Philip F. Meyfarth

It is certified that error appears in the above-identified patent and that said Letters Patent are hereby corrected as shown below:

On the cover sheet [72] should read

-- Inventor: Philip F. Meyfarth, Cleveland, Ohio 44103
(68 Melrose St., Arlington, Mass.) --.

Signed and sealed this 7th day of November 1972.

(SEAL)
Attest:

EDWARD M. FLETCHER, JR.
Attesting Officer

ROBERT GOTTSCHALK
Commissioner of Patents